United States Patent [19]

Mott

[11] Patent Number: 4,842,798
[45] Date of Patent: Jun. 27, 1989

[54] METHOD OF MOULDING RACQUETS WITH STRINGING HOLES

[75] Inventor: Jonathan C. Mott, Liss, England

[73] Assignee: Diversified Products Corporation, Opelika, Ala.

[21] Appl. No.: 96,336

[22] Filed: Sep. 15, 1987

[30] Foreign Application Priority Data

Sep. 17, 1986 [GB] United Kingdom ............... 8622368

[51] Int. Cl.$^4$ .................... B29C 33/48; B29C 45/14
[52] U.S. Cl. .................................... 264/219; 249/142; 249/176; 249/184; 264/277; 264/313; 264/334
[58] Field of Search ............... 264/219, 313, 334, 261, 264/277, DIG. 44, 250; 249/176, 142, 184

[56] References Cited

U.S. PATENT DOCUMENTS

| | | | |
|---|---|---|---|
| 2,085,324 | 6/1937 | Lindner | 264/DIG. 44 X |
| 2,343,205 | 2/1944 | Pudelko | 264/DIG. 44 X |
| 3,318,563 | 5/1967 | Downing | 249/184 X |
| 3,892,831 | 7/1975 | Robin et al. | 264/103 |
| 4,031,181 | 6/1977 | Schaefer et al. | |
| 4,180,542 | 12/1979 | Wrasman | 264/250 X |
| 4,183,776 | 1/1980 | Staub et al. | |
| 4,264,389 | 4/1981 | Staub et al. | |
| 4,297,308 | 10/1981 | Popplewell | 264/250 X |

FOREIGN PATENT DOCUMENTS 1434741 5/1976 United Kingdom .
2148133 5/1985 United Kingdom .

OTHER PUBLICATIONS

Plastics World, "Melt-Away Insert Trims Part Weight", May 1983.
Modern Plastics, "Modified RTM Cuts Cost of Advanced Composites", Mar. 1985.

Primary Examiner—Jan H. Silbaugh
Assistant Examiner—Kelley Sidwell
Attorney, Agent, or Firm—Banner, Birch, McKie & Beckett

[57] ABSTRACT

A method of moulding racquets to define stringing holes in the moulded frame. The method includes forming at least one approximately ladder-shaped member having two side pieces interconnected by rung pieces, with the side pieces substantially conforming to the curved shape of at least part of the frame of the racquet; entrapping the ladder-shaped member between two mould plates defining a mould cavity; injecting a plastic material into the mould cavity to mould the frame around the rung pieces; and forming the ladder-shaped member in two parts and separating the two parts after the frame has been moulded to remove the ladder-shaped member from the moulded frame.

9 Claims, 3 Drawing Sheets

METHOD OF MOULDING RACQUETS WITH STRINGING HOLES

This invention relates to racquets for use in games such as tennis, squash, racquet-ball and the like. The invention is more particularly, but not exclusively, concerned with methods of making fibre-reinforced moulded racquet frames.

It is known to mould racquet frames in fibre-reinforced thermoplastics material, with the fibre reinforcement taking the form of continuous filamentary material woven into a fabric or braid. However, currently available methods of producing such moulded racquet frames suffer from a number of disadvantages. In particular, it is both difficult and time-consuming to provide frames moulded by these methods with stringing holes. It is therefore an object of the present invention to provide methods of making moulded racquet frames, particularly fibre-reinforced moulded racquet frames, in which this particular disadvantage is alleviated.

According to one aspect of the invention, there is provided a method of making a moulded racquet, the method comprising the steps of:

forming at least one approximately ladder-shaped member having two side pieces interconnected by rung pieces, the side pieces being curved in the plane containing the rung pieces to substantially conform to the curved shape of at least part of the frame of the racquet;

entrapping said member between two mould plates containing a mould cavity shaped to define the frame, such that the rung pieces extend across the mould cavity to define stringing holes passing through the moulded frame; and injecting a suitable plastics material into the mould cavity to mould the frame around said rung pieces;

wherein the ladder-shaped member is formed in two parts which each contain a respective one of the side pieces and which are separably fitted together to form the ladder-shaped member, said parts also being moulded from a suitable plastics material and being separated from each other after the moulding of the frame to permit removal of the ladder-shaped member from the moulded frame.

Advantageously, a single ladder-shaped member, shaped to conform to the whole of the region of the frame containing stringing holes, is used.

In a preferred implementation of the invention, the side-piece of the ladder-shaped member adjacent to the portion of the mould cavity defining the radially outer surface of the frame is arranged to project into the mould cavity, so as to form a groove in the radially outer surface of the moulded frame.

The two parts making up the ladder-shaped member preferably fit together along a line passing through each rung piece, typically at or near the mid-point of each rung piece. Thus, the end of each rung piece portion projecting from one side piece can be provided with a projection which fits into a socket provided in the end of each corresponding rung piece portion projecting from the other side piece.

If it is desired to make a fibre-reinforced moulded racquet frame, then advantageously two cores, each including a tube comprising at least one layer of woven reinforcing fibres, are placed in the mould cavity, one on each side of the ladder-shaped member (i.e. one on each side of the split line of the mould) prior to the closure of the mould onto the ladder-shaped member. In this case, the plastics material injected into the mould cavity is preferably a plastics material having a relatively low setting temperature and a relatively low viscosity, such as a methacrylate-based resin.

Each core can comprise an inflatable tube disposed inside the tube of reinforcing fibres, in which case the method can further include the steps of inserting each inflatable tube, either uninflated or lightly inflated, into its tube of reinforcing fibres prior to placing the cores into the mould, and maintaining the inflatable tubes inflated during the injection and setting of the plastics material.

Alternatively and preferably, each core can comprise a plastics foam core member, advantageously an extruded polyethylene foam core member, disposed inside its tube of reinforcing fibres, in which case the method can advantageously further include the step of weaving each tube of reinforcing fibres, preferably in the form of a braid, around its core member.

The reinforcing fibres can be carbon fibres, boron fibres, glass fibres, silicon carbide fibres or aramid fibres of the kind available under the trade name Kevlar, or any combination of these.

Where the tubes of reinforcing fibres are woven into a braid, they are preferably woven in two contrasting colours, for example by using black carbon and yellow Kevlar fibres. This has the effect of producing a striking finished appearance for the frame, as will become apparent hereinafter.

The invention will now be described, by way of example only, with reference to the accompanying drawings, of which:

Figure 1:
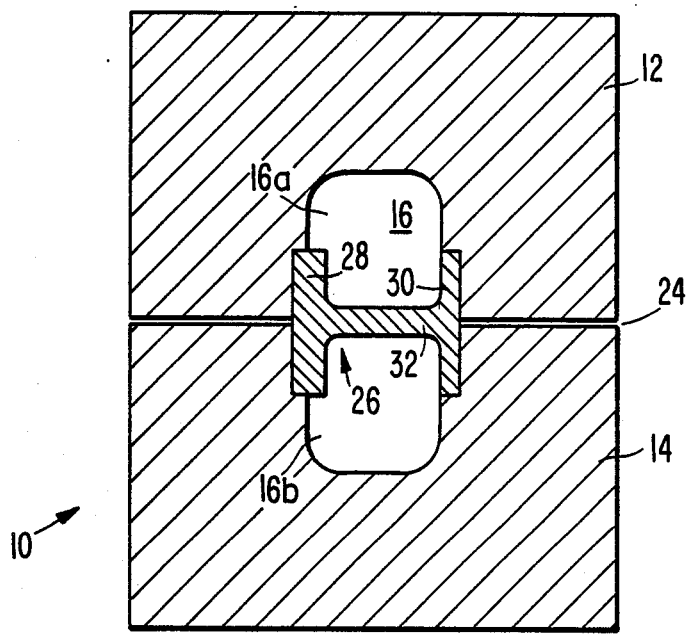
FIG. 1 is a somewhat schematic section view of part of a mould for making a fibre-reinforced moulded racquet by a method in accordance with the present invention.
Figure 2:
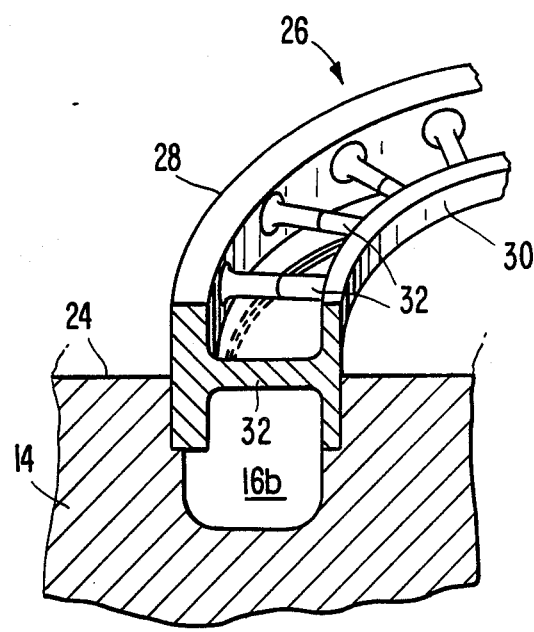
FIG. 2 is an equally schematic, part-sectional, part-perspective view of part of the mould of FIG. 1.
Figure 5:
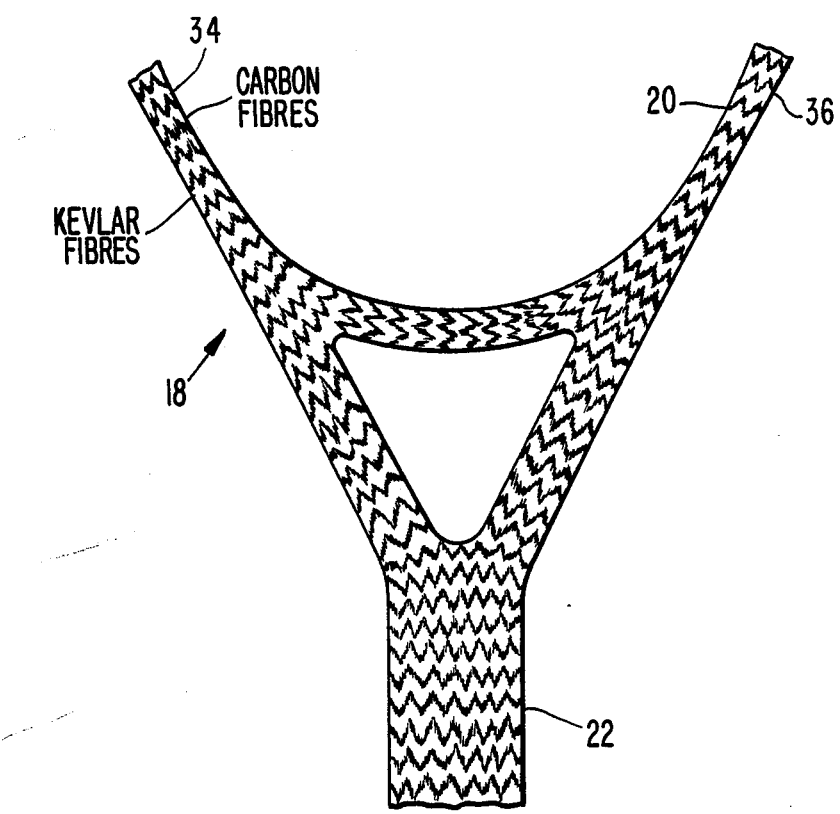
FIG. 5 is a plan view of part of a finished racquet frame moulded in the mould of FIGS. 1 and 2.

The mould shown in part in FIGS. 1 and 2 is indicated generally by reference 10, and comprises upper and lower complementary mould plates 12 and 14 which together define a mould cavity 16 shaped to mould a racquet of the kind indicated at 18 in FIG. 5, this racquet having a frame 20 and a handle 22.

The overall shape of mould plates 12 and 14 in plan view generally corresponds to the overall shape in plan view of the frame 20 and the handle 22 of the racquet 18 of FIG. 5, which in turn is shaped generally as shown more completely in FIG. 1 of United Kingdom Patent Application No. 8426226 (Publication No. 2 148 133A): FIG. 1 hereof is a sectional view of the part of the mould 10 which defines a curved portion of the frame 20 generally opposite the handle 22.

As can best be seen in FIG. 1, the mould plates 12 and 14 meet at a split-line (or split-plane) 24, and are shaped to entrap between them a plastics ladder-shaped member 26, thus dividing the mould cavity 16 into upper and lower halves 16a and 16b respectively. The member 16 comprises first and second curved side pieces 28, 30 curved to follow the curvature of the mould cavity 16, as best seen in FIG. 2. Interconnecting the side pieces 28 and 30 are spaced apart rung pieces 32, which extend across the mould cavity 16 in the split-plane 24, and whose purpose is to define stringing holes passing generally radially through the frame 20 of the racquet 18 of FIG. 5.

The portions of the mould plates 12, 14 defining the right hand side of the mould cavity 16 as viewed in FIG. 1 (which side defines the radially inner periphery 34 of the frame 20 of the racquet 18 of FIG. 5) are recessed to fully receive the side piece 30 of the member 26. Similarly, the portion of the mould plates 12, 14 defining the left hand side of the mould cavity 16 as viewed in FIG. 1 (which side defines the radially outer periphery 36 of the frame 20 of the racquet 18 of FIG. 5) are also recessed, to receive the side piece 28 of the member 26. However the side piece 28 is substantially wider, as viewed in FIG. 1, than the side piece 30, and is only partially received in its recess: the remainder of the side piece 28 protrudes into the mould cavity 16, to define a stringing groove extending around the radially outer periphery 36 of the frame 20 of the moulded racquet 18.

Figure 3:
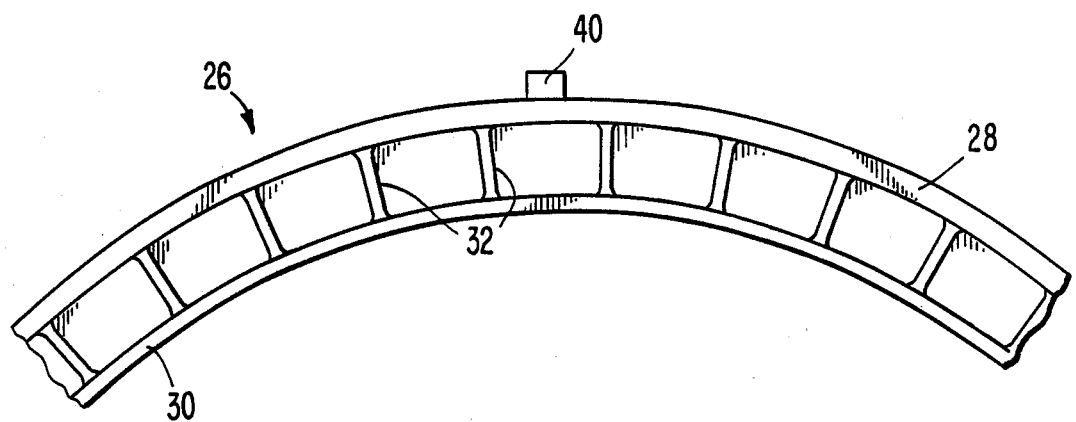
FIG. 3 is a plan view of a ladder-shaped member for use in the mould of FIG. 1.
Figure 4:
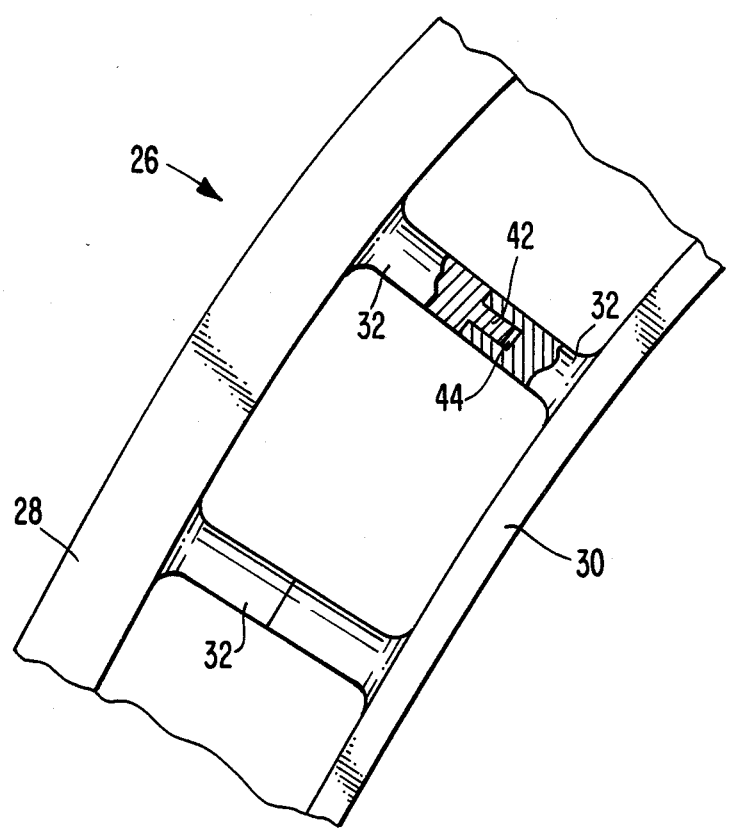
FIG. 4 is a detailed part sectional view of the ladder-shaped member of FIG. 3.

The ladder-shaped member 26 is shown in more detail in FIGS. 3 and 4, from which it can be seen that the side piece 28 is provided with an outwardly projecting spigot 40 (FIG. 3) which co-operates with a corresponding recess (not shown) in one of the mould plates 12, 14, to ensure that the member 26 can be placed in the mould 10 in only one orientation, i.e. the correct orientation. As shown in FIG. 4, the member 26 is made in two separate pieces, which join together along a line passing through the middle of each rung piece 32. To this end, the end of each half rung piece 32 projecting from the side piece 28 is provided with a projecting spigot 42 which is received into, and is a tight fit in, a complementary socket 44 provided in the end of the corresponding half rung piece 32 projecting from the side piece 30.

The member 26 is made from a suitable plastics material such as PTFE.

The frame 20 and a handle 22 of the racquet 18 are reinforced by continuous woven reinforcing fibres, preferably a combination of carbon fibres for tensile and flexural strength and Kevlar fibres for impact resistance. The carbon fibres are black, while the Kevlar fibres are yellow, and respective bundles of both fibres are preferably woven together into a multi-layer tubular braid having a strikingly zig-zag striped appearance of the kind shown in FIG. 5. The braid forms part of a core, which is produced by weaving successive layers of fibres, each layer containing both kinds of fibres, onto an extruded polyethylene foam core member, until a braided tube, four or five layers thick, is woven onto the core member.

The weaving technique involved is known per se, e.g., for the weaving of boot- or shoe-laces on a fibre core, and involves pulling the core member along the centre line or axis of a multi-spindle braiding machine while weaving the first layer therearound, then passing the core member with the first layer of braid on it through the same braiding machine again to weave the second layer therearound, and so on. To give added tensile strength, a layer of longitudinally-extending fibres is applied to the core, preferably between the penultimate and the final braided layers.

The weaving of the braid onto the core member ensures an extremely tight fit therebetween, so that the braid and core member form an almost integral structure with significantly greater integration between the braid and the core member than can be achieved by simply inserting the latter into the former after weaving (particularly bearing in mind that if the braid were separately woven to be such a tight fit on the core member, it would probably not be possible to insert the core member into it).

It will be appreciated that the core can be continuously produced as described above to form considerable continuous lengths thereof, which are typically wound into drums. Then, when required, any desired length of core is simply unwound and cut from the drum.

To mould the racquet 18, a first cut length of the aforementioned core is laid in the lower half 16b of the mould cavity 16 in the lower mould plate 14. The ladder-shaped member 26 is then mounted in the lower mould plate 14, with the lower halves of its side pieces 28 and 30 located in their respective half recesses therein. A second cut length of the aforementioned core is laid on top of the rung pieces 32 of the member 26, and the mould 10 is then closed by closing the upper mould plate 12 onto the lower mould plate 14 as shown in FIG. 1. Preferably, the walls of the mould cavity 16, and the member 26, are sprayed with a releasing agent prior to and during loading the mould 10, to facilitate the removal of the moulded racquet 18 from the mould after the moulding operation.

Once the mould 10 is assembled in its closed condition, a low viscosity, low temperature setting plastics material in the form of a methacrylate-based resin is injected into the mould cavity 16 under pressure. We have found that a particularly suitable resin is that available from the Mond division of ICI under the trademark "Modar 835", which is a high molecular weight methacrylate-based resin in methyl methacrylate solution. It has a viscosity of 40 cps at 20 deg. C. The resin is typically injected at a pressure of 30 p.s.i. and maintained at a temperature of 20 deg. C during curing (or setting), under which condition it sets, and the mould 10 can be opened to remove the racquet 18, in about four minutes. However, if the resin is maintained at a higher temperature of about 85 deg. C, it sets in about one minute.

Even the higher temperature of 85 deg. C is not sufficient to produce any interaction between the resin and the plastics material of the ladder-shaped member 26.

Because of its low viscosity, the methacrylate resin not only penetrates the weave of the reinforcing fibres of the two cores, but also forms a thin layer between the cores on the one hand and the walls of the cavity 16. The formation of this thin layer of resin has the result that, when the mould 10 is opened, the resulting moulded racquet requires little or no further surface finishing to enhance its appearance.

Upon opening of the mould 10, the moulded racquet 18 is with the ladder-like member 26 moulded into it. However the member 26 can be removed from the racquet 18 simply by pulling its two halves apart, thus enabling the respective half rung pieces 32 attached to the side pieces 28, 30 to be withdrawn from the frame 20, leaving stringing holes therein.

Once the member 26 has been removed from the racquet 18, its two halves can be simply re-fitted together, thus enabling it to be used again.

As can be seen in FIG. 4, the connecting points between the rung pieces 32 and the side pieces 28, 30 are suitably smoothly rounded or curved, to ensure that the entry and exit of each stringing hole are correspondingly smoothly rounded or curved around their respective peripheries and so prevent chafing of the strings of the racquet 18.

The frame 20 of the racquet 18 has the rather striking appearance shown in FIG. 5, with a smooth finish and a regular zig-zag pattern of the braid clearly visible through the transparent resin: consequently, little or no surface finishing is necessary. All that remains to complete the racquet 18, therefore, is fitting a suitable grip (not shown) on the handle 22 and securing the stringing (not shown) to the frame 20 by way of the moulded in stringing holes.

It will be appreciated that the above described method of making the racquet 18 has a number of advantages. Primarily, it is relatively fast and clean, and produces a racquet frame that needs little or no further surface finishing and can if desired have a striking appearance. Additionally the use of carbon and Kevlar reinforcing fibres mean that the racquet 18, is light and strong, with good impact resistance.

Many modifications can be made to the above-described of making the racquet 18. For example, reinforcing fibres other than carbon and Kevlar can be used, e.g. glass fibres, silicon carbide fibres or boron fibres, either on their own or in combination with each other. Various different weaving patterns and colour combinations can also be used, to produce different visual effects or patterns in the surface of the finished frame, e.g. diamond patterns, pepper-and-salt patterns and so on. Also, the cores described hereinbefore can each be formed with a hollow inflatable core member in place of a foam core member, this inflatable core member being inserted into the braid while uninflated or only partially inflated, and then fully inflated during the moulding process. Furthermore, other suitable low temperature curing, low viscosity resins or like plastics materials can be used in place of specific methacrylate resin cited, including other resins in the "Modar" range of resins offered by ICI. Indeed a thermosetting plastics material can also be used, as long as it is selected not to interact with the plastics ladder-shaped member 26: however, in that case, some of the advantages of the above-described method of making the racquet 18 would be lost.

I claim:

1. A method of making a moulded racquet frame, the method comprising the steps of:
   forming at least one ladder-shaped member of two separable parts with the ladder-shaped member having two side pieces and a plurality of rung pieces;
   assembling the two separable parts to have the ladder-shaped member have the two side pieces interconnected by the rung pieces and the side pieces being curved in a plane containing the rung pieces to substantially confrom to the curved shape of at least a part of the frame of the racquet;
   entrapping the assembled ladder-shaped member between two mould plates and thereby defining a mould cavity between the interior walls of the mould plates and interior walls of the side pieces of the ladder-shaped member, and defining an area for stringing holes with the rung pieces extending across the mould cavity;
   injecting a plastic material into the mould cavity to mould a racquet frame between the interior walls of the mould plates and side pieces and with the stringing holes formed around the rung pieces;
   removing the moulded racquet from the mould plates; and
   separating the two parts of the ladder-shaped member to remove the ladder-shaped member from the moulded racquet frame.

2. A method as claimed in claim 1, wherein a single ladder-shaped member, shaped to conform to the whole of the region of the frame containing stringing holes, is used.

3. A method as claimed in claim 1 or claim 2, wherein the side-piece of the ladder-shaped member adjacent to a portion of the mould cavity defining the radially outer surface of the frame is arranged to project into the mould cavity, so as to form a groove in the radially outer surface of the moulded frame.

4. A method as claimed in claim 1, wherein the two parts making up the ladder-shaped member fit together along a line passing through each rung piece.

5. A method as claimed in claim 4, wherein the line passes through each rung piece at or near the mid-point thereof.

6. A method as claimed in claim 4 or claim 5, wherein the end of each rung piece portion projecting from one side piece is provided with a projection which fits into a socket provided in the end of each corresponding rung piece portion projecting from the other side piece.

7. A method as claimed in claim 1, wherein two cores, each including a tube comprising at least one layer of woven reinforcing fibres, are placed in the mould cavity, one on each side of the ladder-shaped member prior to the closure of the mould onto the ladder-shaped member.

8. A method as claimed in claim 7, wherein the plastics material injected into the mould cavity is a plastics material having a relatively low setting temperature and a relatively low viscosity.

9. A method as claimed in claim 7, wherein the plastics material injected into the mould cavity is a methacrylate-based resin.

* * * * *